United States Patent
Holleis et al.

(10) Patent No.: US 10,057,876 B2
(45) Date of Patent: Aug. 21, 2018

(54) ANALYSIS AND ADDRESS ALLOCATION OF WIRELESS BUILDING NETWORKS (71) Applicant: TRIDONIC GMBH & CO KG, Dornbirn (AT)

(72) Inventors: Edgar John Holleis, Vienna (AT); Stefan Zudrell-Koch, Hohenems (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 15/441,688

(22) Filed: Feb. 24, 2017

(65) Prior Publication Data
US 2017/0164320 A1 Jun. 8, 2017

Related U.S. Application Data (63) Continuation of application No. 14/239,370, filed as application No. PCT/EP2012/065417 on Aug. 7, 2012, now abandoned.

(30) Foreign Application Priority Data

Aug. 18, 2011 (DE) .......................... 10 2011 081 188

(51) Int. Cl.
*H04W 64/00* (2009.01)
*H04L 12/24* (2006.01)
(Continued)

(52) U.S. Cl.
CPC ...... *H04W 64/003* (2013.01); *H04B 17/0085* (2013.01); *H04B 17/0087* (2013.01);
(Continued)

(58) Field of Classification Search
CPC . H04W 64/003; H04W 16/22; H04W 16/225; H04W 24/08; H04W 24/10;
(Continued)

(56) References Cited

U.S. PATENT DOCUMENTS 8,049,434 B2  11/2011 Crouse et al.
8,063,750 B2  11/2011 Knibbe
(Continued)

FOREIGN PATENT DOCUMENTS

CN  101138280 A  3/2008
CN  101138281 A  3/2008
(Continued)

OTHER PUBLICATIONS

Chinese Office Action and Search Report (translation enclosed) dated Jan. 25, 2017, in a counterpart application.
(Continued)

*Primary Examiner* — Ian N Moore
*Assistant Examiner* — Justin T Van Roie
(74) *Attorney, Agent, or Firm* — Volpe and Koenig, P.C.

(57) ABSTRACT

A network node for a lighting network, the node is at least one of: a light sensor; a motion sensor; lighting means; a control device; or an operating device for the lighting means; and includes means for measuring the signal quality or signal strength of the wireless connection to all wirelessly connected further nodes, storage means configured to store connection information e.g. based on the signal quality or signal strength together with an identifier for the associated wirelessly connected further node(s), and means for wirelessly forwarding the connection information to another node, wherein the network node is configured to receive at least one test pattern and/or to re-send the test pattern, the test pattern including the network node's identifier, e.g. the MAC address.

7 Claims, 4 Drawing Sheets (51) Int. Cl.
  *H04L 12/26* (2006.01)
  *H04W 16/22* (2009.01)
  *H04B 17/318* (2015.01)
  *H04B 17/00* (2015.01)
  *H04L 29/08* (2006.01)
  *H04W 24/08* (2009.01)
  *H04W 24/10* (2009.01)
  *H04L 29/12* (2006.01)

(52) U.S. Cl.
  CPC .......... *H04B 17/318* (2015.01); *H04L 41/12* (2013.01); *H04L 41/145* (2013.01); *H04L 43/045* (2013.01); *H04L 43/0811* (2013.01); *H04L 43/0852* (2013.01); *H04L 67/125* (2013.01); *H04W 16/225* (2013.01); *H04W 24/08* (2013.01); *H04L 61/6022* (2013.01); *H04W 24/10* (2013.01)

(58) Field of Classification Search
  CPC ... H04L 41/12; H04L 41/145; H04L 43/0852; H04L 43/045; H04L 43/0811; H04L 67/125; H04L 61/6022; H04B 17/318; H04B 17/0085; H04B 17/0087
  See application file for complete search history.

(56) References Cited

U.S. PATENT DOCUMENTS

| | | |
|---|---|---|
| 2004/0259554 A1 | 12/2004 | Rappaport et al. |
| 2006/0070113 A1 | 3/2006 | Bhagwat et al. |
| 2007/0025355 A1 | 2/2007 | Cohen et al. |
| 2007/0183344 A1 | 8/2007 | Joshi |
| 2007/0232288 A1 | 10/2007 | McFarland et al. |
| 2008/0157957 A1 | 7/2008 | Pitchers et al. |
| 2008/0198865 A1 | 8/2008 | Rudnick et al. |
| 2008/0279155 A1 | 11/2008 | Pratt et al. |
| 2009/0066473 A1 | 3/2009 | Simons |
| 2009/0147699 A1 | 6/2009 | Ruy et al. |
| 2010/0329123 A1 | 12/2010 | Viswanathan et al. |

FOREIGN PATENT DOCUMENTS

| | | |
|---|---|---|
| CN | 101258781 A | 9/2008 |
| CN | 101479995 A | 7/2009 |
| CN | 101763107 A | 6/2010 |
| DE | 102006015016 B3 | 10/2007 |
| WO | 2006095316 A1 | 9/2006 |
| WO | 2007112975 A1 | 10/2007 |

OTHER PUBLICATIONS

Kyu Hyung Kim et al: "RF-based guard light management system by using Wireless Sensor Network technologies", Ubiquitous and Future Networks (ICUFN), 2011 Third International Confrence on, IEEE, Jun. 15, 2011, pp. 327-331.

Gold S.; Rangarajan, A; A Graduated Assignment Algorithm for Graph Matching. IEEE Transactions on Pattern Analysis and Machine Intelligence, vol. 18, No. 4., pp. 377-388, Apr. 1996.

Sardellitti S.; Barbarossa S.; Energy Preserving Matching of Sensor Network Topology to Dependency Graph of the Observed Field. IEEE 17th International Conference on Digital Signal Processing, pp. 1-8, Jul. 2011.

ANALYSIS AND ADDRESS ALLOCATION OF WIRELESS BUILDING NETWORKS

CROSS REFERENCE TO RELATED APPLICATIONS

This application is a continuation of U.S. patent application Ser. No. 14/239,370, filed Jun. 6, 2014, which is a 371 National Stage Entry of PCT/EP2012/065417, filed Aug. 7, 2012, the entire contents of which are incorporated by reference as if fully set forth.

FIELD OF THE INVENTION

The invention relates to a system and method for assigning addresses, such as logical addresses or building addresses to network nodes for wireless networks, especially wireless building automation networks.

In particular, the invention is directed to the problem of mapping the identity (address) of a wireless device to its physical position.

BACKGROUND

Wireless building automation networks in the sense of the invention are networks used to connect building technology devices forming the network nodes of the wireless network, for example lighting means (such as lamps), operating devices for lighting means, sensors (such as light sensors, movement/motion sensors, acoustic sensors, optical sensors, . . . ) and actors (e.g. for controlling window blinds), and/or other equipment (such as switches, interrupters, e.g. for controlling lights) and/or control units.

The invention is equally applicable to other wireless networks, including but not limited to wireless sensor networks (e.g. for structure health monitoring), wireless industrial control networks, wireless computer networks or wireless telecommunication networks. Especially suited are those networks that require the location of network nodes to be known and where location addresses are (manually) assigned to network nodes.

The invention solves this problem by providing a system, method and network node as set forth in the independent claims.

SUMMARY

Figure 1:
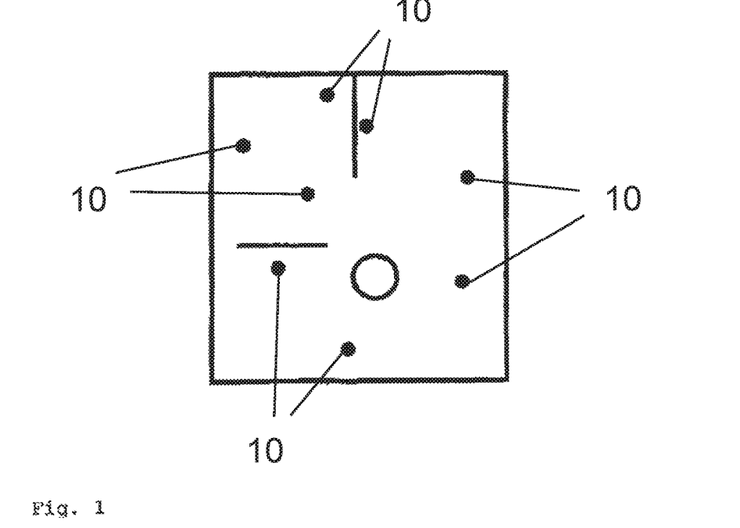
Figure 2:
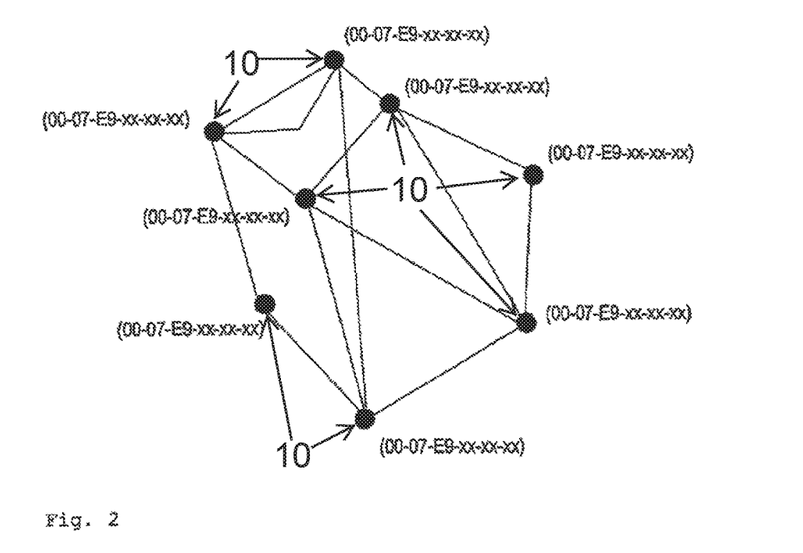
FIG. 2 shows a measured connectivity graph where the vertices (vertices are nodes of a graph) are the network nodes and the edges (thin line) result from measurements of physical parameters of communication channels, as performed by the network nodes. The vertices are exemplarily attributed with their identifiers.
Figure 3:
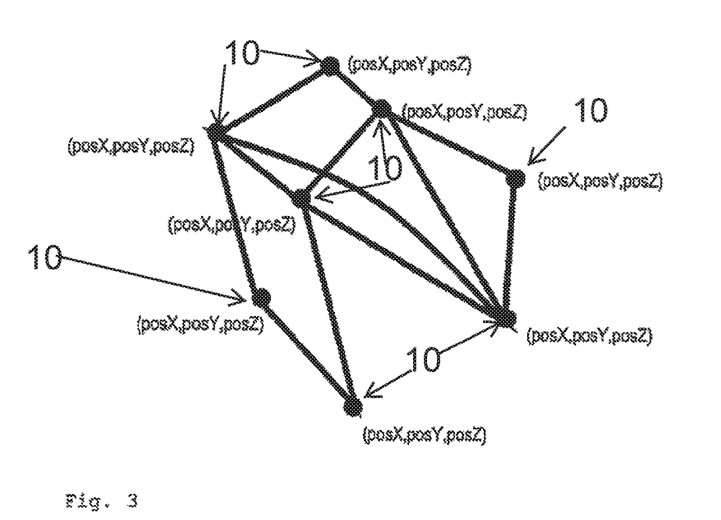
FIG. 3 shows a first simulated connectivity graph where vertices are the network nodes and the edges (thick line) result from a simulation of network node communication channels. The vertices are exemplarily being attributed with the spatial position of their corresponding network nodes.
Figure 4:
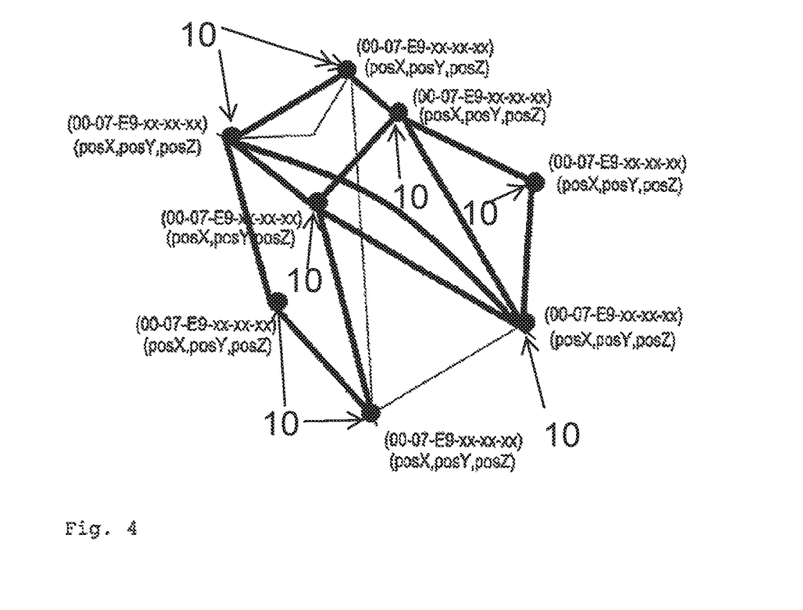
FIG. 4 shows a graph resulting from a successful matching of the first and second graph resulting in a combination of node identifiers and spatial position for each vertex (of course a partial matching would also possible as well as the occurrence of isolated network nodes in one of the graphs)
Figure 5:
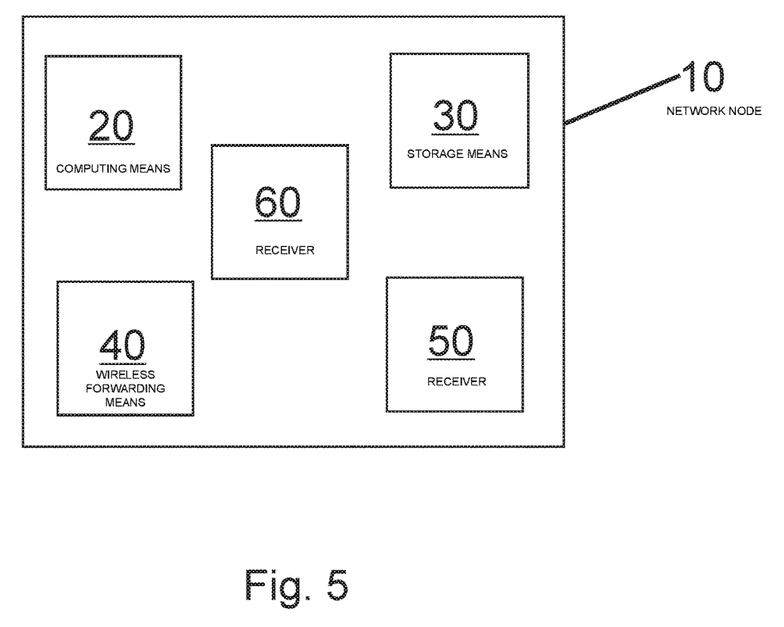
FIG. 5 schematically shows a node and its components.
Figure 6:
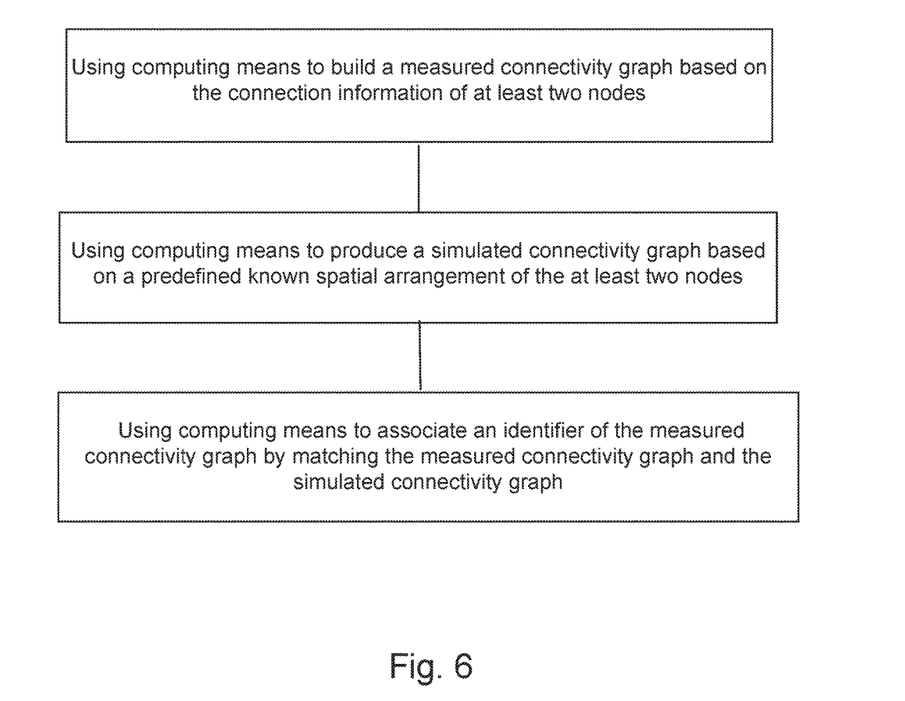
FIG. 6 shows a flow diagram of the method of the disclosure.

In one aspect, the invention provides a network node 10 for a wireless building automation network, such as a lighting network, the node 10 comprising means 20 for computing connection information, i.e. the presence and the distance of one or more neighboring network nodes, based on a measurement of physical parameter of the wireless transmission channel between the neighboring nodes 10 (e.g. the signal quality or signal strength of the wireless connection to all wirelessly connected further nodes), storage means 30 configured to store said connection information together with an identifier for the associated wirelessly connected further node(s) 10, and means 40 for wirelessly forwarding the connection information to another node 10. The network node 10 is configured to receive and/or send and/or echo at least one test pattern, the test pattern including the network node's identifier, e.g. the MAC address.

The node can be a sensor such as e.g. a light, temperature, occupancy, smoke or movement sensor.

The node can be an operating device for lighting means, such as e.g. halogen, LED, OLED or gas discharge lamps.

The network node may store the connection information and node identifiers in a neighbor table (a list of nodes the particular node is able to directly reach over the wireless channel).

The network node can store connection information to more than one network node.

The network node may be configured to receive and store neighbor tables of other network nodes and/or combine the received network nodes to a graph or sub-graph using a computing means.

The network node can provide a transmitting means to send the stored neighbor table(s), graph and/or subgraph.

The measured physical parameter, e.g. on radio links, may be provided by a network node and can be combined by a network node with measured connection information provided by a second network node.

The pattern can e.g. be sent at, transmission power, in different encoding schemes configurations.

The network node can store the network node's identifier originating from the test pattern. It can derive a channel characteristic for the communication channel the pattern was received on. Of all received test patterns, the network node may compose the neighbor table.

The test pattern can either be a specially formed wireless packet optimized for measuring a certain channel characteristic, or it can be regular network packet without special characteristics. The measured channel characteristic may also be derived from regular network traffic, the test pattern in this case being implicit.

The network node can at least be one of a sensor, lighting means, control device, operating device for lighting means, actor and building technology device.

In another aspect, the invention also provides a system having at least two nodes as described above, as well as computing means designed for building a measured connectivity graph based on the connection information of said at least two nodes, and on the other hand producing a simulated connectivity graph based on a predefined known spatial arrangement of the at least two nodes as well as their building environment, and associating the identifier of the connection information with a spatial position of each of the at least two nodes by matching the measured connectivity graph and the simulated connectivity graph.

The simulation can use a ray-tracing method to simulate connectivity between the nodes.

The two graphs may be at least partially matched. The measured connection information is provided as a neighbor table. The measured connection information, e.g. on radiolinks, provided by a network node can be combined by a network node with measurement-based connection information provided by a second network node.

The measurement may be triggered by a specific command sent to the network nodes, wherein all network nodes activate respective receiving means.

In yet another aspect, the invention provides a method for automatically assigning spatial positions to network nodes of a building automation network, such as a lighting network, the node, having at least two nodes as defined above, comprising the steps of building a measured connectivity graph based on the connection information of at least two nodes, producing a simulated connectivity graph based on a predefined known spatial arrangement of the at least two nodes as well as their building environment, and associating the identifier of the connection information with a spatial position of each of the at least two nodes by matching the measured connectivity graph and the simulated connectivity graph.

BRIEF DESCRIPTION OF THE DRAWINGS

Further aspects of the invention are now described in view of the figures, wherein FIG. 1 schematically shows a floor plan with network nodes installed (dots).

DETAILED DESCRIPTION OF THE PREFERRED EMBODIMENTS

In the inventive system, each network node that participates in the network is preferably identifiable by an identifier, e.g. a distinct network address, assigned to the network node at production stage, henceforth referred to as MAC address.

In a first step of the inventive method, each network node creates a neighbor table. This neighbor table for each network node contains the network nodes that the network node can reach, i.e. the network node can communicate with. The neighbor table can also contain additional information such as signal strength or signal quality of each communication channel to another node in the neighbor table. The creation of neighbor tables taken alone is known from the prior art, e.g. from the ZigBee standard with mesh routing of the ZigBee Alliance (http://www.zigbee.org/).

Measuring the signal strength or signal quality (e.g. RSSI, Received Signal Strength Indication) of neighboring nodes is just one example for gathering connection information, i.e. the presence and the distance of one or more neighboring network nodes, based on the measurement of a physical parameter of the wireless transmission channel between the neighboring nodes.

"Based on the measurement of a physical parameter" is to be understood in the sense that the connection information can be identical to the measured value, or be a value derived from the measured value.

Additionally or alternatively, other physical parameters may be used. E.g., wireless communication nodes can measure the time ("Time of Flight") a package, e.g. a data package and/or the test pattern, needs for radio wave propagation. From this measured time the distance between the nodes can be derived and used as distance measurement. This method is especially useful for topology analysis of outdoor wireless networks with wirelessly connected network nodes such as street lamps, traffic signs, light modules, cameras, sensors, illuminated advertising and others. In this scenario, the network nodes are typically separated by greater distances as indoor network nodes. Using the Time of Flight instead of e.g. RSSI (Received Signal Strength Indication) produces more reliable and more exact distances between the network nodes. This method can also be combined with the method described above, and e.g. one method can (signal quality/strength) be used for indoor analysis while the other method (Time of flight) is used for outdoor analysis.

In a second step, the neighbor tables of all network nodes are collected, e.g. on a central node or a control unit. Based on the neighbor tables a graph is then created, in which the network nodes are graph vertices and the edges in the graph represent possible communication channels between a network node and its neighbors in alignment with the information derived from the neighbor table for each device. Additional information such as signal strength or signal quality is represented as attributes or as weights for the graph edges. Hence, the generated graph represents the relative positions of the network nodes to each other on basis of communication channel measurements each network node performed to generate the neighbor table. In this graph, each network node is identified with an identifier, e.g. a unique address such as a MAC address. In one aspect of the invention, the nodes in the neighbor tables are also identified with their respective identifier.

Next, a second graph building/installation is generated based on, e.g., a plan (construction plan) of a building, in which the position of the installed network nodes is marked (at least the nodes that should be installed according to the plan). While the vertices of the second graph are easily derivable from the plan used, connecting these vertices by edges is performed by taking into account features of the plan such as thickness of walls and ceilings, material used in the building and other factors that can be derived from the plan used.

Based on this information, the communication channels possible between the installed nodes are simulated or calculated and the edge-weights are the calculated signal strength or signal quality of the communication channel.

For simulating the communication channels between the network nodes, e.g. ray tracing can be used. Using ray tracing, the node communication channels of the installed nodes can be simulated or calculated by placing the eye-point (camera point) in one network node (that is at the position of the installed network node) and putting the light source in another installed network node {that is at the position of another installed network node).

Taking into account the information of the used plan, e.g. ceilings, walls, material used in the building, the communication channels can be established by tracing the way from the eye-point to the light or vice versa. The communication channels between a vertex and its simulated neighbors, i.e. the network nodes a network node can connect to, can e.g. also be stored in a table. By this, the communication channels simulated in the second graph also take into account physical conditions of the building, such as multi-path propagation caused by reflections and/or absorptions by walls and ceilings. The plan used herein can of course be a 3D-plan, e.g. a CAD-plan.

Based on the simulation, and taking into account the spatial positions, the second graph is assembled directly. The simulation is performed on computer hardware and may be sped-up by use (special) GPUs (Graphics Processing Unit). As a result, the vertices of the second graph are attributed by positioning or location information.

It is now the goal of the invention to match the two graphs, in order to assign network identifiers of the first graph to the node positions derived from the plan in the second graph. Hence the invention aims at automatically assigning the logical addresses or positions to the hardware identifiers of the network nodes.

In the next step, both graphs are therefore matched to each other to find the most promising and most probable alignment of the production addresses to the absolute or relative coordinate derived from the plan used.

For example, in a newly installed wireless network system the network nodes can be put in a mode in which they perform measurements to fill their neighbor tables and to obtain parameters such as RSSI (Received Signal Strength Indicators) and/or LQI (Link Quality Indicator) which are also stored in the neighbor table for each neighbor. The neighbor table can also contain more than one entry to a particular neighbor as a means to account for multipath propagation due to reflections or similar phenomena resulting from the features of the building. Similarly, the second graph can also contain more than one edge between nodes as a result of the simulation taking multipath propagation into account.

E.g. the equalizer built into GSM modules, which is amongst other things responsible for cancellation of the echo resulting from multipath propagation, is able to provide measurement data on the multipath propagation characteristics of the channel. The workings of the equalizer can also be included into the simulation such as to later incorporate multipath propagation characteristics into graph matching.

The neighbor tables resulting from these measurements can then be collected in a central point and might, e. g. by being transmitted wirelessly to this central point.

A neighbor table already represents a small sub-graph of network as seen from only one particular network node. It is possible to join sub-graphs together to build ever larger sub-graphs, representing ever larger portions of the overall network. Therefore, a hierarchy can be established where at the lowest hierarchy level at least the neighbor tables (sub-graphs) of two network nodes are joined, where the sub-graph is submitted to a next level, which then joins the received sub-graph with another sub-graph and so on until all neighbor tables are joined. This join-operation can also be performed by the network nodes, at the periphery of the network. A network node can be designated to output the fully joined graph.

In one aspect of the invention it is possible that the matching of the first and the second graph is not unambiguously defined or is not possible at all. In this case, information is provided to a human user including the information about the nodes, the network nodes, for which the fixed addresses of the network node could not be matched to a logical address, e.g. the position of the device in the building. With this information, the human user can complete or perform the matching. Test runs of the algorithm show that only a few network nodes remain unmatched and therefore, the algorithm significantly supports a human user by automatically matching logical addresses to fixed network node addresses.

A detailed and exemplary description of the invention is now provided.

For solving the above problems, the inventive system and method hence features three components:

1. Channel estimation: A mechanism to produce a network-wide estimation of the wireless connectivity based on geographical layout, floor plan and deployment plan of the wireless network.

2. Channel measurement: A mechanism to gather actual connectivity information and device identities from the deployed wireless network.

3. Matching algorithm: A mechanism to match estimated and actual channel characteristic to produce a mapping between wireless device identities and their physical positions as charted in the deployment plan.

In order to commission a wireless network, the identities and positions of the network nodes need to be known. In the past there have been two approaches of solving this problem: Assigning identities (addresses) during installation or during commissioning of the wireless network using some out-of-band mechanism; and registering previously assigned or randomly assigned identities during installation or commissioning using some out-of-band mechanism.

The invention now solves the addressing problem using "in-band" mechanisms, thereby eliminating one otherwise manually performed step from the installation and start-up procedure.

The necessary building, floor and/or deployment plans most of the time are already available as they need to be produced for installation purposes.

To the addressing problem, there exists an affiliated problem known as "wireless location estimation". The key difference to the addressing problem is that wireless location estimation aims at producing a position expressed in coordinates (meters). It maps information on connections to positions. Wireless topology analysis, on the other hand, rearranges previously known positions according to connection information so as to map addresses to positions.

The channel estimate, the second graph, is a graph where the installed network nodes are the vertices and the radio links between the devices are the edges.

The vertices are attributed by the device types (manufacturer/type designation) and the device positions. The edges are assigned weights which indicate some quality of the wireless channel, mostly the received signal strength or time of flight. The graph may be fully connected, or the edges where the weight is smaller than some cut-off-value or threshold may be removed during graph generation.

The crucial problem is how to calculate the weights of the second (simulated) graph. Using the distance between node positions is not a good enough estimate. Therefore, additional information derived from the plan (walls, floors, ceilings, their thickness and material, position of doors and windows) is used in a ray tracing algorithm that for each pair of devices calculates an estimate for the signal strength by factoring in signal reflection and transmission through obstacles. Additionally, factors such as mounting orientation of network nodes, antenna characteristics, RF reflecting or absorbing materials such as metal panels in dropped ceilings, concrete reinforcements, RF propagation via outside space, lift shafts, fire doors, etc. can be accounted for in the model.

The channel measurement, the first graph, has the same basic form as the channel estimate (graph, vertices, attributes, edges, weights) but is measured using dedicated network functionality: The wireless network is set to a "channel measurement mode" during which normal operation is interrupted. The procedure is as follows:

The procedure is introduced by a command broadcast from a management device to all network nodes of the network.

All network nodes 10 permanently activate their receivers 50, 60, even network nodes 10 that would normally keep their receiver 50, 60 deactivated most of the time.

A special test pattern is propagated throughout the network using a similar strategy as broadcasting. All devices need to re-broadcast the pattern. Extra care can be taken to avoid or mitigate the chances of collisions. The test pattern includes each sending network node's preconfigured identifier, e.g. the MAC address. The test pattern may spawn several messages, possibly sent at different levels of transmission power, in different sub-channels, using different encoding schemes or antenna configurations.

Network nodes 10 receiving the test pattern save the originator's identifier and derive a channel characteristic, for example the received signal strength. Out of all received test patterns, the devices compose a neighbor table containing identifiers and connectivity information. Due to memory constraints, the neighbor table may be shortened to only include the neighbors which were received most strongly.

Network nodes 10 can then return to normal behavior with respect to power cycling the receiver 20, 30.

Finally the devices transmit their own identifier (MAC level address, manufacturer, type designation, . . . ) and the neighbor table back to the management device.

At that point the channel measurement graph can be constructed by assembling the received identities and neighbor tables into a weighted, attributed graph, the first graph. Each edge and weight is composed of a maximum of two neighbor table entries (each of the adjacent vertices receiving the test pattern form the other). Due to channel asymmetry, receiver and transmitter differences and time variability of the channel, the two received signal strengths corresponding to one edge of the graph may differ or one of them may be absent. Big deviations may be a sign of test pattern collisions or interference. Also the above channel measurement procedure may be repeated or for the affected sub graph.

The two graphs resulting from channel estimation and channel measurement are substantially similar. They differ in the vertices of channel estimation being attributed with a location or position, e.g., a position in a building, and the vertices of the channel measurement being attributed with the identifiers. Other than the attributes, the graphs also differ with respect to simulation and measurement errors, and most importantly, they are thoroughly permuted with respect to each other.

If the vertices that correspond to each other in the two graphs are found, this results in the desired mapping from identifier to position. While the two graphs are topologically similar, they are by no means the same.

The numeric values from estimation and measurement are profoundly divergent, and also small topological differences may need to be tolerated for (wrongly installed or defective network nodes show up differently or not at all in the measurement).

The problem of matching two topologically similar, weighted and optionally attributed graphs against each other is called the weighted graph matching problem. There is an amount of academic research about it, mainly in the field of pattern recognition.

Finding the optimum match is hard, since its complexity grows with the faculty of the graph size. There exist however several heuristic approaches, cited below.

The heuristic is based on a 1996 paper by Steve Gold and Anand Rangarajan "A Graduated Assignment Algorithm for Graph Matching". The algorithm seeks to find a permutation matrix M that encodes the sought after mapping between the first graph and the second graph. M is found by minimizing the following objective function $E_{wg}$ (M):

$$E_{wg}(M) = -\frac{1}{2}\sum_{a=1}^{A}\sum_{i=1}^{I}\sum_{b=1}^{A}\sum_{j=1}^{J} M_{ai} M_{bj} C_{aibj}$$

A and I are the sizes of the adjacency matrices G1 and G2 representing the two graphs. $C_{aibj}$ is distance measure between edges of the graphs and compares all edges of G1 to all edges of G2. It is defined by:

$$C_{aibj} = \begin{cases} 0 & \text{if neither } G_{1,ab} \text{ or } G_{2,ij} \text{ is NULL} \\ 1 - c|G_{1,ab} - G_{2,ij}| & \text{otherwise} \end{cases}$$

c is a normalization constant that normalizes the expected edge-distance in $C_{aibj}$ to be zero-mean.

The product $M_{ai}M_{bj}$ in the objective function $E_{wg}(M)$ selects just the right edge-distances from $C_{aibj}$ such that the objective becomes minimal if M represents the right permutation.

Because of the discrete nature of the optimization problem (M is a permutation matrix and contains only zeros and ones), it is hard to solve directly. Instead, the algorithm follows a graduated optimization strategy starting with a relaxed version of the problem that iteratively solves the optimization problem.

Optimization step: Solve the optimization for a doubly stochastic matrix M instead of a permutation matrix. A doubly stochastic matrix can be thought of a continuous equivalent of the discrete permutation matrix. The optimization step is performed by calculating the partial derivative $Q = \partial E_{wg}/\partial M$ and then applying Sinkhorn's algorithm to find a doubly stochastic result.

Soft max step: Prior to Sinkhorn's algorithm the partial derivative is scaled by a soft-max: $M'_{ai} = \exp(\beta Q_{ail})$. $\beta$ starts small and is increased at every iteration to push the doubly stochastic matrix to approach a permutation matrix.

The algorithm works as exemplarily shown below in a pseudo-code notation:

```
Initialize β to β₀, M_ai to 1
   Do until β > β_f
      Do until M converges
         Q_ai ← - ∂E_wg/ ∂M
         M'_ai ← exp (βQ_ai)
      Do until M' converges
         Update rows of M': M'_ai ← M'_ai/ Σ_r M'_ai
         Update cols of M': M'_ai ← M'_ai/ Σ_A M'_ai
      M ← M'
   β ← βrβ
```

$\beta$, $\beta_r$, $\beta_0$, $\beta_f$ are the control parameter, its rate of increase, its start and end value. The most computationally expensive step is calculating the partial derivative. It is implemented to run on the GPU (a powerful graphics co-processor) and uses sparse matrix representation for the adjacency matrices G1 and G2.

The complexity of the algorithm is proportional to the square of the combined number of edges in both graphs and in the current implementation can match graphs up to 2000 vertices and 40000 edges in a matter of minutes on current computer hardware.

If the method laid out above cannot find a good match, possibly due to too much symmetry in the geometry of the building, or due to bad estimates, the matching mechanism can ask the operator to give it additional fixed points. It calculates the location with the biggest topological ambiguity and asks the operator to walk there, and manually, using some out-of-band method, uncover the address of a particular device occupying a particular position. With that additional information the matching method is run again until a solution with high enough confidence is found.

What is claimed is:

1. A lighting system comprising:
   a plurality of wirelessly communicating nodes, at least one of said wirelessly communicating nodes being a lighting means and the remaining wirelessly communicating nodes are individually selected from the group consisting of: a light sensor; a motion sensor; an acoustic sensor; and an operating device for said lighting means,
   at least two vertices, and
   computing means configured for:
      building a measured connectivity graph based on the connection information of said wirelessly communicating nodes, each vertex of said measured connectivity graph corresponding to an identifier of one of said wirelessly communicating nodes,
      producing a simulated connectivity graph based on a predefined known spatial arrangement of the wirelessly communicating nodes as well as the building environment of the wirelessly communicating nodes, each vertex of said simulated connectivity graph corresponding to a spatial position and wherein the simulated connectivity graph uses a ray-tracing method to simulate connectivity between the wirelessly communicating nodes, and
      associating an identifier of the measured connectivity graph with a spatial position of the simulated connectivity graph by matching the measured connectivity graph and the simulated connectivity graph, wherein the wirelessly communicating nodes comprise:
   means for measuring a physical parameter of the wireless connection to all wirelessly connected nodes,
   storage means configured to store connection information based on the measured physical parameter together with an identifier for each associated node of the wirelessly connected nodes,
   means for wirelessly forwarding the connection information to another node, and
   means for at least one of: sending; receiving; or echoing at least one test pattern, the test pattern including the wirelessly communicating node's identifier,
   wherein measured connection information provided by a first of the wirelessly connected network nodes is combined by a third of the wirelessly connected network nodes with measured connection information provided by a second of the wirelessly connected network nodes.

2. The lighting system of claim 1, wherein the two graphs are at least partially matched.

3. The lighting system of claim 1, wherein the connection information is provided as a neighbor table.

4. The lighting system of claim 1, wherein measurement of the connection information is triggered by a specific command sent to the wirelessly communicating nodes, wherein all wirelessly communicating nodes activate respective receiving means.

5. The lighting system of claim 1, wherein a test pattern is propagated to the wirelessly communicating nodes, wherein all wirelessly communicating nodes re-send the pattern, wherein the test pattern includes each sending wirelessly communicating node's identifier and wherein the pattern messages are sent: at different levels of transmission power, or in different sub-channels, or using at least one of: different encoding schemes or antenna configurations.

6. The lighting system of claim 5, wherein the test pattern is used to measure time of flight.

7. The lighting system of claim 5, wherein the wirelessly communicating nodes receiving the test pattern store the originating wirelessly communicating node's identifier and derive a channel characteristic for the communication channel the pattern was received on, and wherein, of all received test patterns, the wirelessly communicating nodes compose neighbor tables.

* * * * *